US010061247B2

(12) United States Patent
Tanaka et al.

(10) Patent No.: US 10,061,247 B2
(45) Date of Patent: Aug. 28, 2018

(54) IMAGE FORMING APPARATUS

(71) Applicant: KYOCERA Document Solutions Inc., Osaka (JP)

(72) Inventors: Hiroyuki Tanaka, Osaka (JP); Motoyuki Fukuda, Osaka (JP); Tetsuya Ichiguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/544,169

(22) PCT Filed: Aug. 26, 2016

(86) PCT No.: PCT/JP2016/075039
§ 371 (c)(1),
(2) Date: Jul. 17, 2017

(87) PCT Pub. No.: WO2017/073155
PCT Pub. Date: May 4, 2017

(65) Prior Publication Data
US 2017/0371285 A1 Dec. 28, 2017

(30) Foreign Application Priority Data
Oct. 28, 2015 (JP) .................... 2015-211432

(51) Int. Cl.
*G03G 15/00* (2006.01)
*B65H 31/02* (2006.01)
*B41J 29/38* (2006.01)

(52) U.S. Cl.
CPC .......... *G03G 15/5016* (2013.01); *B41J 29/38* (2013.01); *B65H 31/02* (2013.01); *G03G 15/65* (2013.01)

(58) Field of Classification Search
CPC ................................ G03G 15/5016
See application file for complete search history.

(56) References Cited

U.S. PATENT DOCUMENTS

| | | | | |
|---|---|---|---|---|
| 2004/0223171 | A1 | 11/2004 | Kobayashi et al. | 358/1.6 |
| 2012/0155909 | A1* | 6/2012 | Hashimoto | G03G 15/5016 399/81 |
| 2013/0120778 | A1* | 5/2013 | Tanonaka | B65H 5/00 358/1.12 |

FOREIGN PATENT DOCUMENTS

JP 2004-334035 A 11/2004

* cited by examiner

*Primary Examiner* — Clayton E Laballe
*Assistant Examiner* — Jas Sanghera
(74) *Attorney, Agent, or Firm* — Stein IP, LLC

(57) ABSTRACT

Provided is an image-forming device with which it is possible to achieve a smaller size while suppressing a reduction in visibility or operability of an operation panel. In this image-forming device, paper sheets are discharged from the rear side of the device toward the front side of the device, and the image formation device is provided with: a paper-sheet-loading unit in which the paper sheets are loaded; an operation panel disposed on the downstream-side end in the paper sheet discharge direction of the paper-sheet-loading unit, at least a part of the operation panel being disposed in a loading region of the paper-sheet-loading unit; and a protruding part disposed to the side of the operation panel in the loading region, the protruding part protruding upward from the top surface of the paper-sheet-loading unit, and extending in the paper sheet discharge direction.

11 Claims, 3 Drawing Sheets

IMAGE FORMING APPARATUS

CROSS-REFERENCE TO RELATED APPLICATIONS

This application is a national stage of International Application No. PCT/JP2016/075039, filed Aug. 26, 2016, which claims the benefit of priority to Japanese Application No. 2015-211432, filed Oct. 28, 2015, in the Japanese Patent Office, the disclosures of which are incorporated herein in their entireties by reference.

TECHNICAL FIELD

The present invention relates to an image forming apparatus such as a copier or a printer. More particularly, the present invention relates to an image forming apparatus that includes a sheet placement portion on which sheets discharged from the rear side of the apparatus toward the front side of the apparatus are stacked and an operation panel.

BACKGROUND ART

Conventionally, image forming apparatuses are known that include a sheet placement portion on which sheets discharged from the rear side of the apparatus toward the front side of the apparatus are stacked and an operation panel arranged in the sheet placement portion.

For example, Patent Document 1 discloses an image forming apparatus that includes a sheet discharge portion (sheet placement portion) on which sheets discharged from the rear side of the apparatus toward the front side of the apparatus are stacked and an operation panel arranged in the sheet discharge portion. The operation panel includes an operation portion having a plurality of operation keys and a display portion. In this image forming apparatus, some of the operation keys are arranged within a sheet discharge region (sheet placement region) of the sheet discharge portion while other operation keys (such as a Start key and a Stop Printing key) which are frequently used during sheet discharging and a display portion are arranged outside the sheet discharge region. Thus, it is possible to prevent degradation of the visibility and operability of the operation panel.

LIST OF CITATIONS

Patent Literature

Patent Document 1: JP-A-2004-334035

SUMMARY OF THE INVENTION

Technical Problem

However, in the image forming apparatus of Patent Document 1 mentioned above, the operation keys which are frequently used during sheet discharging and the display portion are arranged outside the sheet discharge region, and thus it is difficult to reduce the size of the apparatus.

Devised against the background discussed above, an object of the present invention is to provide an image forming apparatus that achieves size reduction while preventing degradation of the visibility and operability of an operation panel.

Means for Solving the Problem

According to a first aspect of the present invention, an image forming apparatus discharges a sheet having an image formed on it from the rear side of the apparatus toward the front side of the apparatus. The image forming apparatus includes a sheet placement portion on which sheets discharged are stacked, an operation panel which is arranged in a downstream end part of the sheet placement portion in the sheet discharge direction and which has at least part of it arranged in a placement region of the sheet placement portion, where sheets are stacked, and a protruding portion which is arranged to a side of the operation panel in the placement region and which extends in the sheet discharge direction while protruding upward beyond a top surface of the sheet placement portion.

Advantageous Effects of the Invention

According to the first aspect of the present invention, the image forming apparatus is provided with the protruding portion which is arranged to a side of the operation panel in the placement region and which extends in the sheet discharge direction while protruding upward beyond the top surface of the sheet placement portion. This permits a sheet discharged on the sheet placement portion to be lifted up off the top surface by being supported on the protruding portion. Thus, even when the operation panel is arranged in the placement region, owing to a gap being formed between the operation panel and the sheet, it is possible to prevent degradation of the visibility and operability of the operation panel.

It is not necessary to secure a space, for arranging the operation panel, outside the placement region; this achieves size reduction of the apparatus.

Further features and advantages of the present invention will become apparent from the description of embodiments given below.

DESCRIPTION OF EMBODIMENTS

Hereinafter, embodiments of the present invention will be described with reference to the accompanying drawings.

First Embodiment

Figure 1:
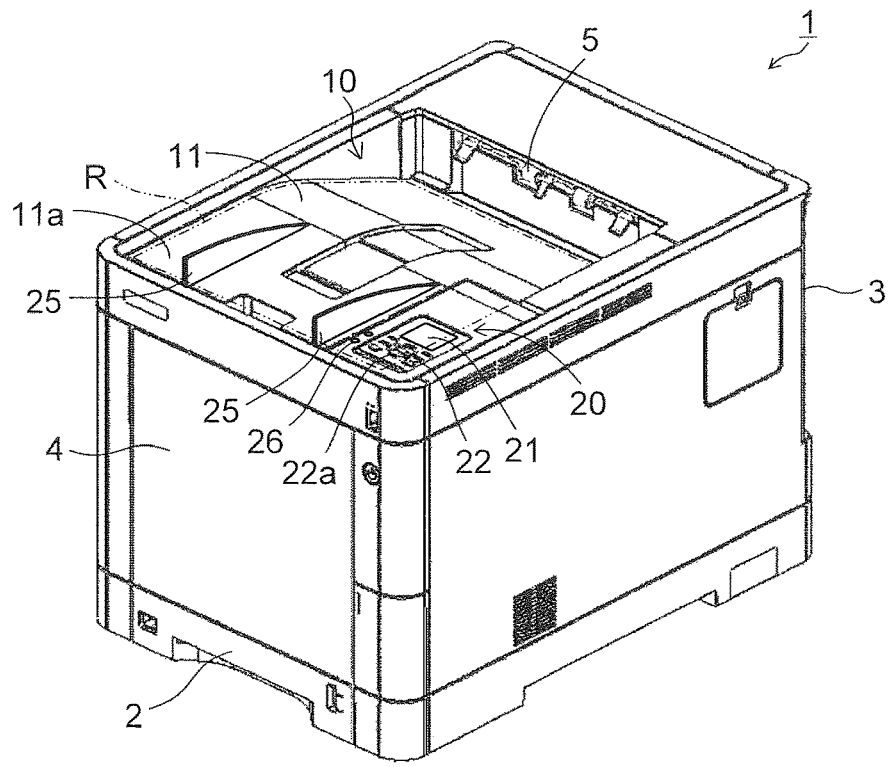
FIG. 1 is a perspective view showing the structure of an image forming apparatus according to a first embodiment of the present invention, showing a state where protruding portions are arranged in a protruding position.

With reference to FIGS. 1 to 4, a description will be given of an image forming apparatus 1 according to a first embodiment of the present invention. As shown in FIG. 1, the image forming apparatus 1 has an apparatus main body 3 having a substantially hexahedral structure. In a front part of the apparatus main body 3 that a user faces, there are provided a front cover 4 which is openably/closably fitted to the apparatus main body 3 and which serves as a manual feed tray when it is open, and a sheet feed cassette 2 which is removably inserted in the apparatus main body 3. In an upper part of the apparatus main body 3, there are provided a sheet placement portion 10 onto which a sheet having an image formed on it is discharged by a discharge roller 5, and an operation panel 20.

In the apparatus main body 3, there are arranged an image forming portion, a fixing portion, a sheet conveyance passage, etc., of which none is illustrated. The image forming portion transfers, based on image data received from a terminal such as a personal computer, a toner image to a sheet which is fed to it, thereby forming an image. The image forming portion includes a photosensitive drum (image carrying member) which carries an electrostatic latent image, a charging unit which electrostatically charges the surface of the photosensitive drum, an exposure unit which forms an electrostatic image corresponding to a document image on the surface of the photosensitive drum with a laser beam or the like, a developing device which forms a toner image by attaching developer to the formed electrostatic latent image, a transfer roller which transfers the toner image to a sheet, a cleaning blade which removes toner left unused on the surface of the photosensitive drum, etc. The fixing portion heats and presses the sheet having the toner image transferred to it, thereby fixing the toner image to the sheet.

The sheet placement portion 10 includes a discharge tray 11 on which sheets discharged from the rear side of the apparatus toward the front side of the apparatus are stacked. In a downstream-side end part of the sheet placement portion 10 in the sheet discharge direction, the operation panel 20 is arranged.

Figure 2:
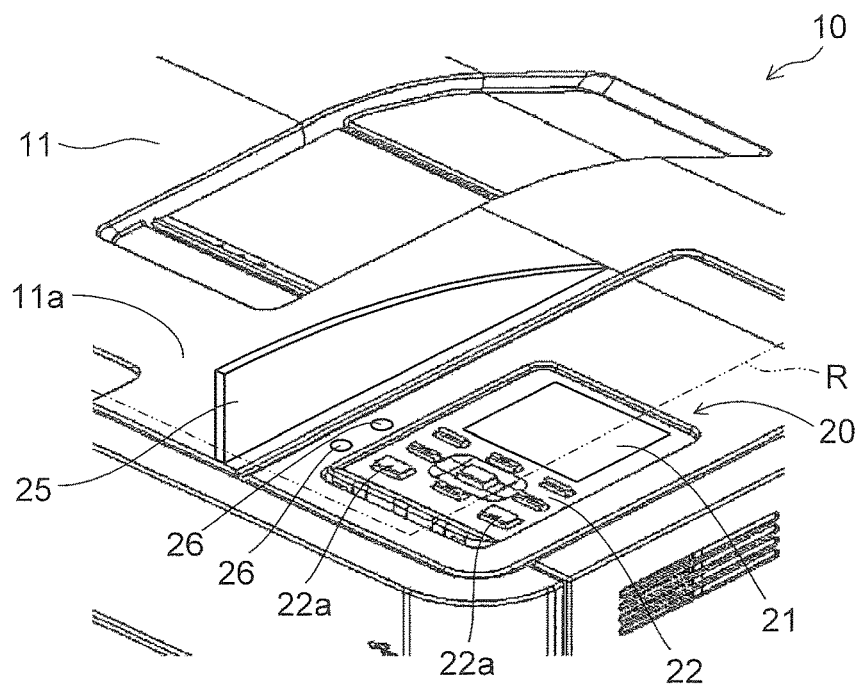
FIG. 2 is a perspective view showing the structure around an operation panel of the image forming apparatus according to the first embodiment of the present invention.
Figure 3:
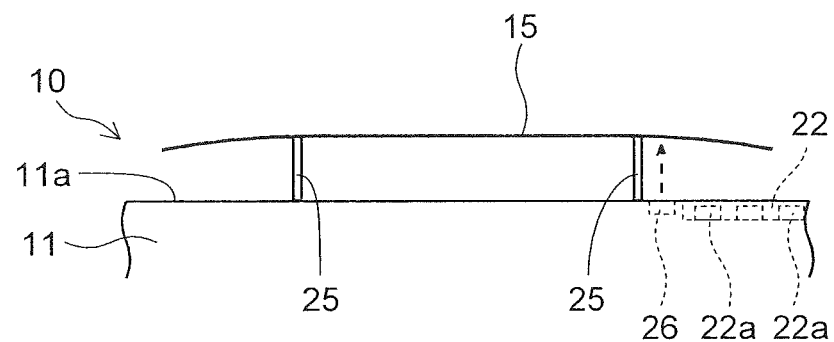
FIG. 3 is a view, as seen from in front of the apparatus, around the protruding portions of the image forming apparatus according to the first embodiment of the present invention.

The operation panel 20 includes a display portion 21 which is, for example, a liquid crystal panel that displays information related to image formation, and an operation portion 22 having a plurality of operation keys 22a. At least part of the operation panel 20 is arranged in a placement region R of the sheet placement portion 10, where sheets are stacked. In this embodiment, at least a half of the display portion 21 and at least a half of the operation portion 22 are arranged in the placement region R. As shown in FIGS. 2 and 3, the operation keys 22a are arranged to be flush with, or below, a top surface 11a of the discharge tray 11.

In the placement region R, to a side of the operation panel 20 (in the sheet width direction orthogonal to the sheet discharge direction), there are formed two protruding portions 25 in the shape of a thin plate extending in the sheet discharge direction while protruding upward beyond the top surface 11a. The two protruding portions 25 are arranged at a predetermined interval from each other in the sheet width direction. The protruding portions 25 are formed on the top surface 11a of the discharge tray 11 such that their height (amount of protrusion) increases from the upstream side toward the downstream side in the sheet discharge direction. As shown in FIG. 3, with a sheet 15 discharged on the sheet placement portion 10, the protruding portions 25 form, between the top surface 11a and the sheet 15, a gap into which a user's finger tip can be inserted. Downstream-side parts of the protruding portions 25 in the sheet discharge direction protrude upward, for example, 15 mm or more beyond the top surface 11a.

Figure 4:
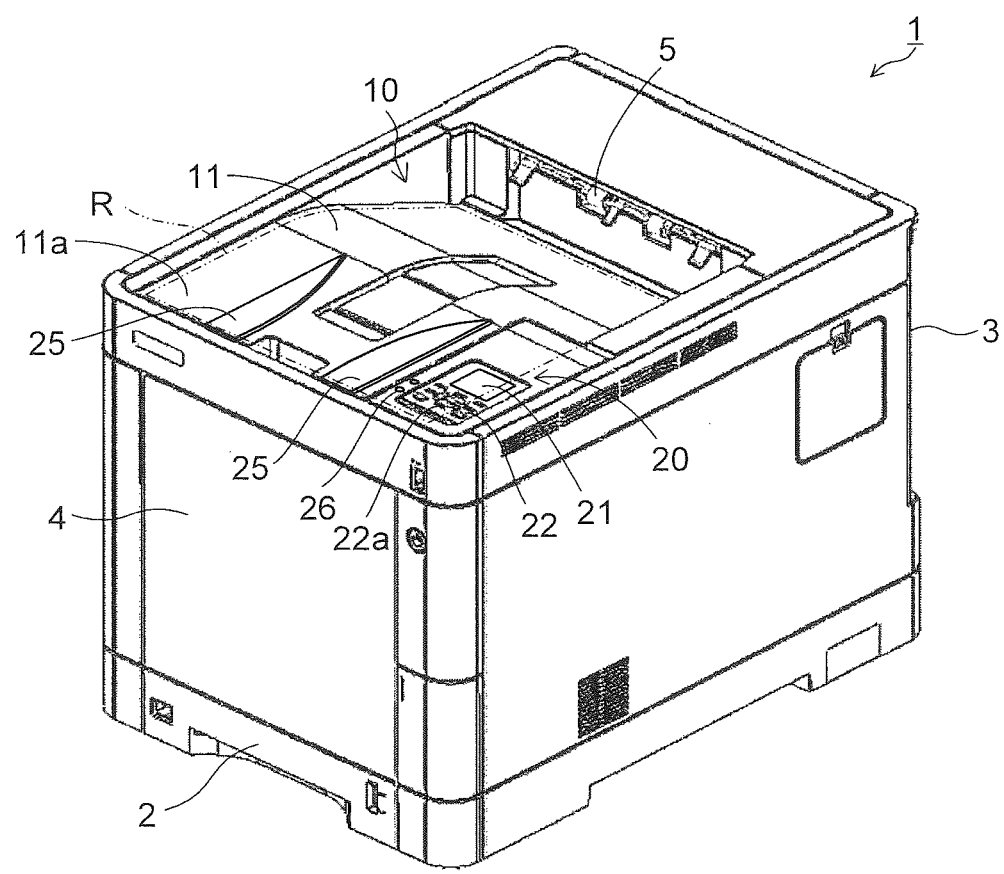
FIG. 4 is a perspective view showing the structure of the image forming apparatus according to the first embodiment of the present invention, showing a state where the protruding portions are arranged in a non-protruding position.

The protruding portion 25 is, by swinging about a rotation pivot (unillustrated) arranged in a lower end part of the protruding portion 25, arranged selectively either in a protruding position where it protrudes upward beyond the top surface 11a (the position in FIG. 1) or in a non-protruding position where it lies flat along the top surface 11a (the position in FIG. 4). Here, a recess may be provided in the top surface 11a to accommodate the protruding portion 25 when it is arranged in the non-protruding position.

Around the protruding portion 25, a plurality of (here two) indicator lamps 26 composed of LEDs are provided for giving a user predetermined notifications (notifications of an image formation error, a sheet conveyance error, etc.). In this embodiment, the indicator lamps 26 are arranged on the side of one protruding portion 25 opposite from the other protruding portion 25 (on the right side of the right-side protruding portion 25 in FIG. 1). The indicator lamps 26 are aligned along one protruding portion 25 in the sheet discharge direction. As shown in FIG. 3, the indicator lamps 26 are arranged to be flush with, or below, the top surface 11a, and radiate light upward. The light emitted from the indicator lamps 26 is reflected on the reverse side of the sheet 15, and is thus visible through the gap between the sheet 15 and the top surface 11a.

In this embodiment, as described above, the protruding portions 25 are provided which are arranged to a side of the operation panel 20 in the placement region R and which extend in the sheet discharge direction while protruding upward beyond the top surface 11a. This permits the sheet 15 discharged on the sheet placement portion 10 to be lifted up off the top surface 11a by being supported on the protruding portions 25. Thus, even when the operation panel 20 is arranged in the placement region R, owing to a gap being formed between the operation panel 20 and the sheet 15, it is possible to prevent degradation of the visibility and operability of the operation panel 20.

Thus, it is not necessary to secure a space, for arranging the operation panel 20, outside the placement region R; this achieves size reduction of the apparatus.

As described above, by arranging the indicator lamps 26 along one protruding portion 25, it is possible to form a predetermined space between the sheet 15 and the indicator lamps 26; this makes it possible to prevent degradation of the visibility of the lighting state of the indicator lamps 26. In a case where the indicator lamps 26 are arranged outward of the protruding portions 25 (here, on the side of one protruding portion 25 opposite from the other protruding portion 25), if the plurality of indicator lamps 26 are aligned in the sheet width direction, when an end part of the sheet 15 sags, the space between the sheet 15 and the indicator lamps 26 may become narrow; this may degrade the visibility of the lighting state of the indicator lamps 26. Thus, by aligning the plurality of indicator lamps 26 along one protruding portion 25, it is possible to prevent degradation of the visibility of the lighting state of the indicator lamps 26.

As described above, the indicator lamps 26 are arranged to be flush with, or below, the top surface 11a. Thus, it is possible to prevent, with the protruding portions 25 arranged in the non-protruding position, the sheet 15 or the like from being caught on the indicator lamps 26, and to prevent, when a finger is inserted into a gap between the top surface 11a and the sheet 15 with the protruding portions 25 arranged in the protruding position, the finger from being caught on the indicator lamps 26. The indicator lamps 26 radiate light upward, and thus the light from the indicator lamps 26 is reflected on the reverse side (bottom surface) of the sheet 15. Thus, a user can see the light of the indicator lamps 26 through a gap between the sheet 15 and the top surface 11a.

As described above, with the sheet 15 discharged on the sheet placement portion 10, the protruding portions 25 form, between the top surface 11a and the sheet 15, a gap into which a finger tip can be inserted. This makes it easy to take out (hold) the sheet 15 discharged on the sheet placement portion 10.

As described above, the protruding portion 25 is arranged selectively either in the protruding position where it protrudes upward beyond the top surface 11a (the position in FIG. 1) or in the non-protruding position where it lies flat along the top surface 11a (the position in FIG. 4). Thus, the protruding portions 25 can be retracted when the image forming apparatus 1 is not in use.

It is notably effective in preventing degradation of the visibility of the display portion 21 to apply the present invention to a case in which a half or more of the display portion 21 is arranged in the placement region R as described above.

Second Embodiment

Figure 5:
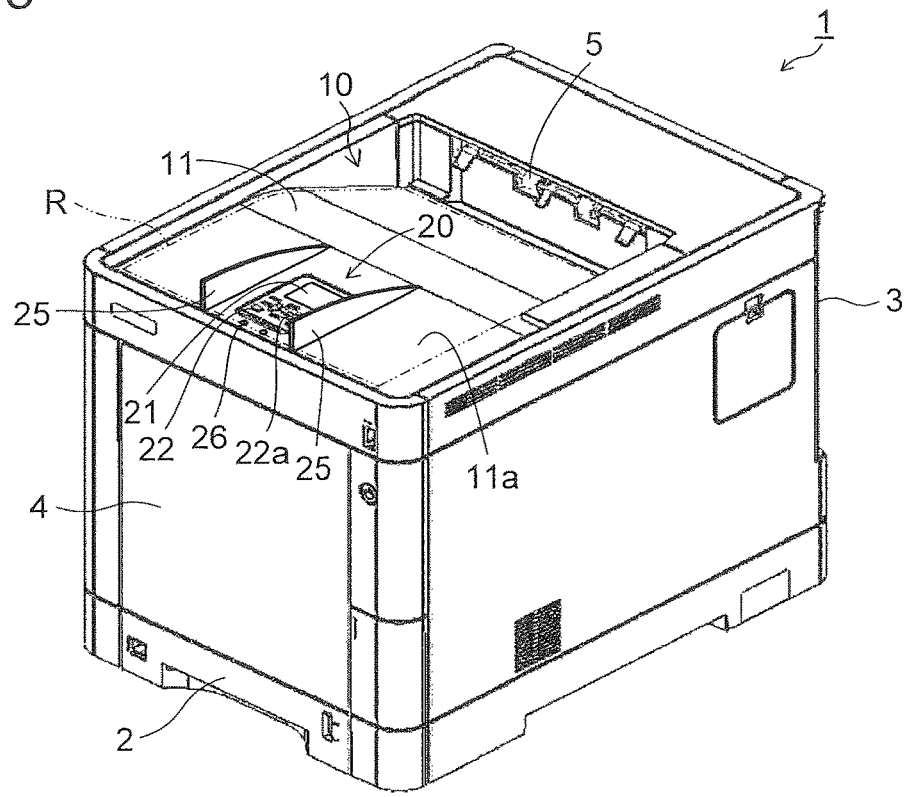
FIG. 5 is a perspective view showing the structure of an image forming apparatus according to a second embodiment of the present invention, showing a state where protruding portions are arranged in a protruding position.

In a second embodiment of the present invention, as shown in FIG. 5, the operation panel 20 is arranged in a central part of the placement region R in the sheet width direction. Thus, the entire operation panel 20 is arranged in the placement region R, and the protruding portions 25 are arranged on opposite sides of the operation panel 20 in the sheet width direction.

Figure 6:
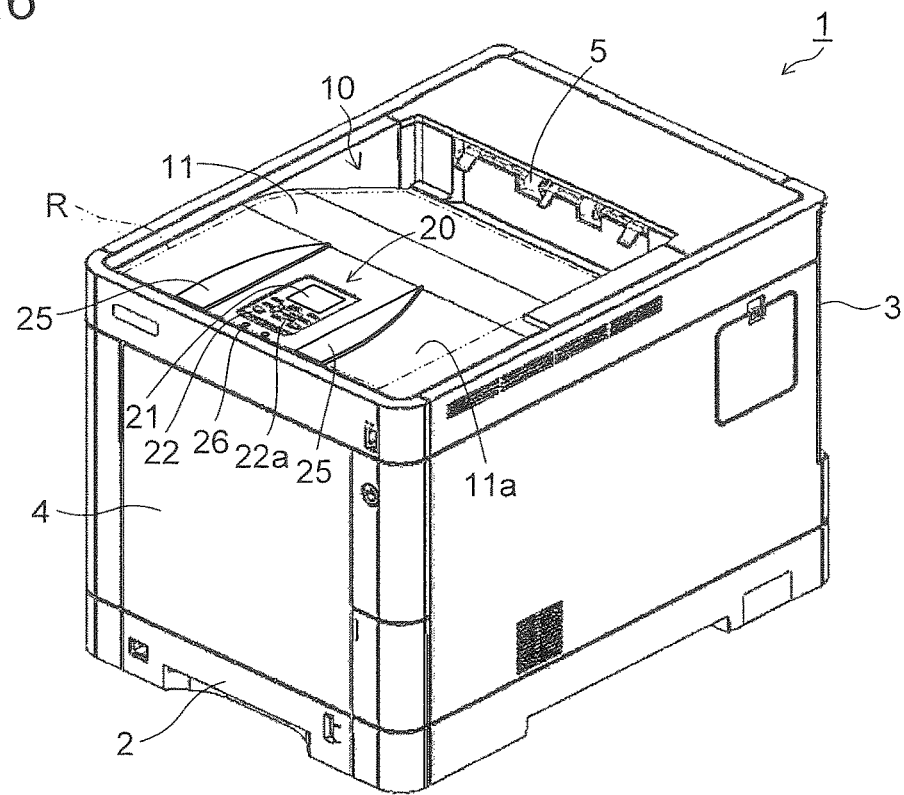
FIG. 6 is a perspective view showing the structure of the image forming apparatus according to the second embodiment of the present invention, showing a state where the protruding portions are arranged in a non-protruding position.

The protruding portion 25 is, by swinging about a rotation pivot (unillustrated) arranged in a lower end part of the protruding portion 25, arranged selectively either in a protruding position where it protrudes upward beyond the top surface 11a (the position in FIG. 5) or in a non-protruding position where it lies flat along the top surface 11a (the position in FIG. 6). In this embodiment, as shown in FIG. 6, the protruding portions 25 are brought down in the directions opposite to those in the previously-described first embodiment (outward in the sheet width direction).

The indicator lamps 26 are arranged between the two protruding portions 25, and are aligned in the sheet width direction along the downstream end of the sheet placement portion 10 in the sheet discharge direction.

Otherwise, the structure in the second embodiment is similar to that of the previously-described first embodiment.

In this embodiment, by arranging the protruding portions 25 to the opposite sides of the operation panel 20 as described above, it is possible to prevent the sheet 15 from sagging over to the operation panel 20, and thus to prevent degradation of the visibility and operability of the operation panel 20.

As described above, the indicator lamps 26 are arranged between the two protruding portions 25. The sheet 15 is less likely to sag between the two protruding portions 25, and it is thus possible, irrespective of whether the indicator lamps 26 are arranged along the protruding portion 25 or arranged along the sheet width direction, to prevent degradation of the visibility of the lighting state of the indicator lamps 26 resulting from sagging of the sheet 15. The indicator lamps 26 have better visibility when they are arranged close to the front of the apparatus, and thus the indicator lamps 26 are preferably arranged along the downstream end of the sheet placement portion 10 in the sheet discharge direction as shown in FIG. 5.

Otherwise, the effects of the second embodiment are similar to those of the previously-described first embodiment.

It should be understood that the embodiments disclosed herein are in every aspect illustrative and not restrictive. The scope of the present invention is defined not by the description of embodiments given above but by the appended claims, and encompasses many modifications and variations made in the sense and scope equivalent to those of claims.

For example, although an example has been dealt with in which the present invention is applied to a printer, this is not meant as any limitation. Needless to say, the present invention is applicable to various image forming apparatuses provided with an operation panel arranged in a sheet placement portion, examples including copiers, multifunction peripherals, facsimile machines, inkjet recording devices, scanners provided with a document conveyance device, etc.

Although the above-embodiments deal with an example where the two protruding portions 25 are provided, this is in no way meant to limit the present invention. For example, as in the previously-described first embodiment, in a case where the operation panel 20 is arranged close to one side (the right side in FIG. 1) in the sheet width direction, one protruding portion 25 (the right-side protruding portion 25 in FIG. 1) alone may be provided.

Although the above-described embodiments deal with an example where the operation panel 20 includes the display portion 21 and the operation portion 22, this is in no way meant to limit the present invention. The operation panel 20 does not have to include the display portion 21. The operation panel 20 may include a touch panel-type display portion having a display portion and an operation portion integrated together.

Although the above-described embodiments deal with an example where the protruding portions 25 are formed to be collapsible, this is in no way meant to limit the present invention, and thus the protruding portions 25 may be configured to be attachable/detachable to the top surface 11a.

Although, for example, the previously-described first embodiment deals with an example where, when arranged on the side of one protruding portion 25 opposite from the other protruding portion 25 (on the right side of the right-side protruding portion 25 in FIG. 1), the indicator lamps 26 are aligned in the sheet discharge direction along one protruding portion 25, and the previously-described second embodiment deals with an example where, when arranged between the two protruding portions 25, the indicator lamps 26 are aligned in the sheet width direction, this is in no way meant to limit the present invention. For example, when arranged on the side of one protruding portion 25 opposite from the other protruding portion 25 (on the right side of the right-side protruding portion 25 in FIG. 1), the indicator lamps 26 may be aligned in the sheet width direction along the downstream end of the sheet placement portion 10 in the sheet discharge direction; when arranged between the two protruding portions 25, the indicator lamps 26 may be aligned in the sheet discharge direction along one protruding portion 25.

The invention claimed is:

1. An image forming apparatus which discharges a sheet having an image formed thereon from a rear side of the apparatus toward a front side of the apparatus, the image forming apparatus comprising:

a sheet placement portion on which sheets discharged are stacked;

an operation panel arranged on a top surface of the sheet placement portion, in a downstream-side end part of the sheet placement portion in a sheet discharge direction, the operation panel having at least part thereof arranged in a placement region on the top surface of the sheet placement portion, where sheets are stacked; and a protruding portion arranged to a side of the operation panel in the placement region, the protruding portion extending in the sheet discharge direction while protruding upward beyond the top surface of the sheet placement portion, wherein the operation panel has a display portion which displays information related to image formation, and at least part of the display portion is arranged in the placement region.

2. The image forming apparatus of claim 1, wherein the operation panel is arranged in a central part of the placement region in a sheet width direction orthogonal to the sheet discharge direction, and the protruding portion comprises protruding portions arranged respectively on opposite sides of the operation panel in the sheet width direction.

3. The image forming apparatus of claim 1, wherein on the top surface of the sheet placement portion, around the protruding portion, an indicator lamp is provided for giving a user a predetermined notification.

4. The image forming apparatus of claim 3, wherein the protruding portion comprises two protruding portions arranged at a predetermined interval from each other in a sheet width direction orthogonal to the sheet discharge direction, and the indicator lamp is arranged between the two protruding portions.

5. The image forming apparatus of claim 3, wherein the protruding portion comprises two protruding portions arranged at a predetermined interval from each other in a sheet width direction orthogonal to the sheet discharge direction, and the indicator lamp is arranged to a side of one protruding portion of the two protruding portions opposite from another protruding portion of the two protruding portions, the indicator lamp comprising a plurality of indicator lamps arranged along the one protruding portion.

6. The image forming apparatus of claim 3, wherein the indicator lamp is arranged to be flush with, or below, the top surface.

7. The image forming apparatus of claim 1, wherein with the sheets discharged on the sheet placement portion, the protruding portion forms, between the top surface and the sheets, a gap into which a finger tip is insertable.

8. The image forming apparatus of claim 1, wherein the protruding portion is arranged selectively in a protruding position where the protruding portion protrudes upward beyond the top surface or in a non-protruding position where the protruding portion lies flat along the top surface.

9. The image forming apparatus of claim 1, wherein at least a half of the display portion is arranged in the placement region.

10. An image forming apparatus which discharges a sheet having an image formed thereon from a rear side of the apparatus toward a front side of the apparatus, the image forming apparatus comprising:

a sheet placement portion on which sheets discharged are stacked;

an operation panel arranged in a downstream-side end part of the sheet placement portion in a sheet discharge direction, the operation panel having at least part thereof arranged in a placement region of the sheet placement portion, where sheets are stacked; and a protruding portion arranged to a side of the operation panel in the placement region, the protruding portion extending in the sheet discharge direction while protruding upward beyond a top surface of the sheet placement portion, wherein the operation panel is arranged in a central part of the placement region in a sheet width direction orthogonal to the sheet discharge direction, and the protruding portion comprises protruding portions arranged respectively on opposite sides of the operation panel in the sheet width direction.

11. An image forming apparatus which discharges a sheet having an image formed thereon from a rear side of the apparatus toward a front side of the apparatus, the image forming apparatus comprising:

a sheet placement portion on which sheets discharged are stacked;

an operation panel arranged in a downstream-side end part of the sheet placement portion in a sheet discharge direction, the operation panel having at least part thereof arranged in a placement region of the sheet placement portion, where sheets are stacked; and a protruding portion arranged to a side of the operation panel in the placement region, the protruding portion extending in the sheet discharge direction while protruding upward beyond a top surface of the sheet placement portion, wherein around the protruding portion, an indicator lamp is provided for giving a user a predetermined notification, the protruding portion comprises two protruding portions arranged at a predetermined interval from each other in a sheet width direction orthogonal to the sheet discharge direction, and the indicator lamp is arranged to a side of one protruding portion of the two protruding portions opposite from another protruding portion of the two protruding portions, the indicator lamp comprising a plurality of indicator lamps arranged along the one protruding portion.

* * * * *